US006943908B1

(12) United States Patent
Omgba

(10) Patent No.: US 6,943,908 B1
(45) Date of Patent: Sep. 13, 2005

(54) PROCESS FOR TRANSMITTING FACSIMILES BETWEEN TWO FACSIMILE MACHINES CONNECTED TO A DATA TRANSMISSION NETWORK

(75) Inventor: Louis Bede Omgba, Jouy le Moutier (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/526,886

(22) Filed: Mar. 16, 2000

(30) Foreign Application Priority Data

Mar. 16, 1999 (FR) .................................. 99 03206

(51) Int. Cl.[7] .............................. B41B 1/00; H04N 1/32; H04N 1/00
(52) U.S. Cl. ....................... 358/1.15; 358/442; 358/435
(58) Field of Search ................................ 358/468, 434, 358/444, 425, 426, 1.15, 442, 404; 370/252, 370/286; 709/232, 227; 379/100.01

(56) References Cited

U.S. PATENT DOCUMENTS

| 5,416,607 | A | * | 5/1995 | Tezuka et al. | ............... | 358/468 |
|---|---|---|---|---|---|---|
| 5,509,050 | A | * | 4/1996 | Berland | ........................ | 455/557 |
| 5,696,760 | A | * | 12/1997 | Hardin et al. | ................ | 370/252 |
| 5,754,946 | A | * | 5/1998 | Cameron et al. | ........... | 340/7.22 |
| 5,790,641 | A | | 8/1998 | Chan et al. | | |
| 5,828,468 | A | | 10/1998 | Lee et al. | | |
| 5,903,849 | A | * | 5/1999 | Selin et al. | .................. | 455/557 |
| 6,061,150 | A | * | 5/2000 | Yamamoto | ................... | 358/444 |
| 6,088,337 | A | * | 7/2000 | Eastmond et al. | ........... | 370/280 |
| 6,115,142 | A | * | 9/2000 | Leung | ........................ | 358/434 |
| 6,185,195 | B1 | * | 2/2001 | Leung | ........................ | 370/286 |
| 6,470,391 | B2 | * | 10/2002 | Takamoto et al. | ........... | 709/227 |
| 6,487,179 | B1 | * | 11/2002 | Leung | ........................ | 370/286 |
| 6,603,577 | B1 | * | 8/2003 | Ravishankar et al. | ....... | 358/434 |
| 6,622,172 | B1 | * | 9/2003 | Tam | ........................... | 709/232 |
| 6,628,414 | B1 | * | 9/2003 | Gabrielsen et al. | ........ | 358/1.15 |
| 6,704,317 | B1 | * | 3/2004 | Dobson | ...................... | 370/401 |
| 6,781,722 | B1 | * | 8/2004 | Goldsmith | .................. | 358/437 |
| 2001/0040702 | A1 | * | 11/2001 | Leung | ........................ | 358/434 |
| 2001/0043618 | A1 | * | 11/2001 | Chien et al. | ................ | 370/498 |

FOREIGN PATENT DOCUMENTS

WO    WO9723087    6/1997

* cited by examiner

*Primary Examiner*—Madeleine Nguyen
(74) *Attorney, Agent, or Firm*—Birch, Stewart, Kolasch & Birch LLP

(57) ABSTRACT

According to the process for transmission of a packet of facsimile data between a first and a second facsimile machine via a transmission network, a process is provided in which the first facsimile machine transmits the data intended for the second facsimile machine and repeats its transmission in the absence of a response within a predetermined period (T). The packet of the first facsimile machine and its moment of transmission are input. The packet is transmitted to the second facsimile machine, a response from the second facsimile machine and the corresponding moment of reception are input, and the interval of time between this moment of reception and the expiry of the period (T) are determined. If the interval of time is greater than a threshold (P), the response of the second facsimile machine is retransmitted to the first facsimile machine. If it is not greater, the response is blocked.

7 Claims, 2 Drawing Sheets

Figure 1:
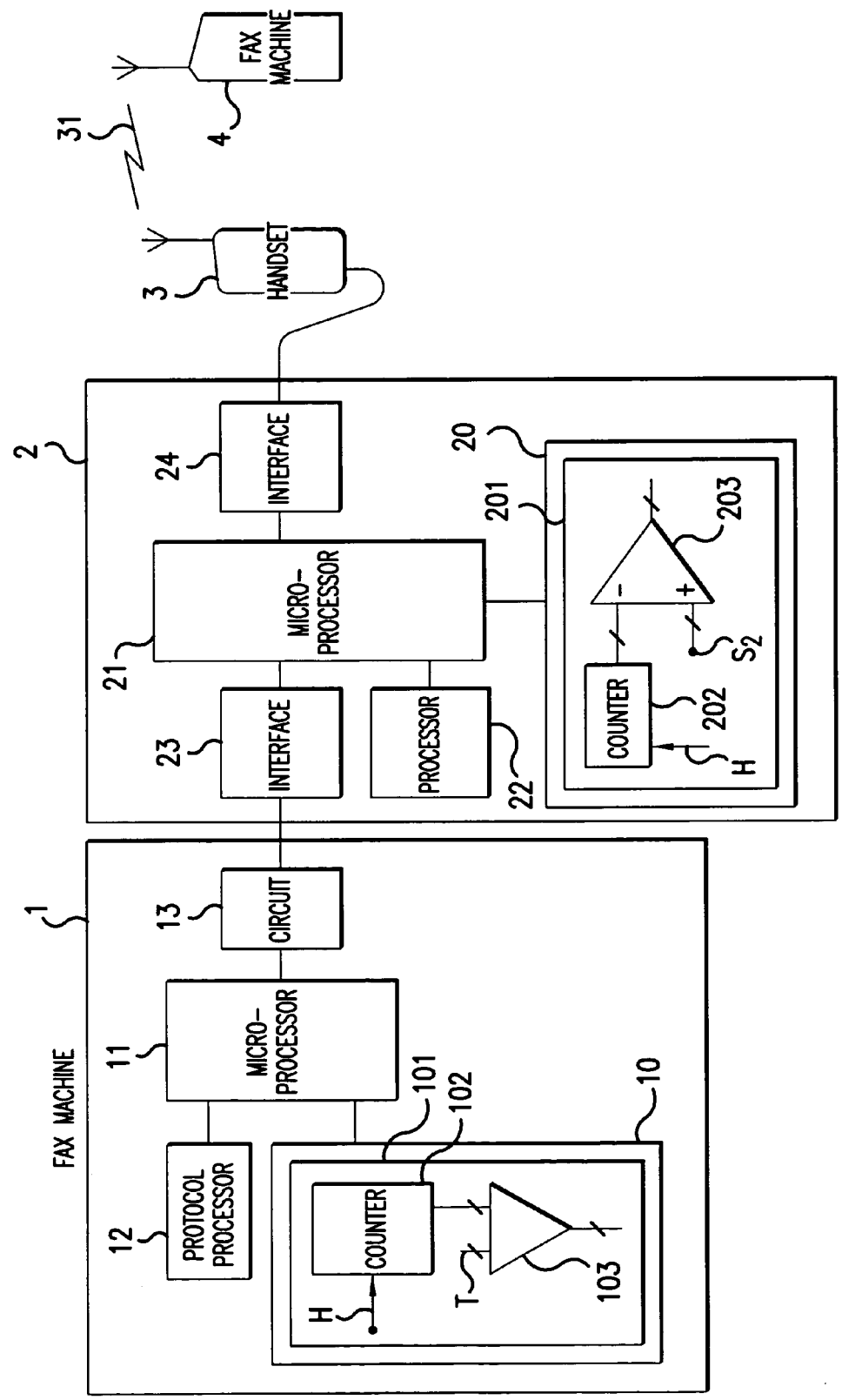

PROCESS FOR TRANSMITTING FACSIMILES BETWEEN TWO FACSIMILE MACHINES CONNECTED TO A DATA TRANSMISSION NETWORK

BACKGROUND OF THE INVENTION

The transmission of a facsimile between two facsimile machines is carried out according to a data exchange protocol which makes it possible to accommodate transmission delays on the switched telephone network (STN).

Thus when one of the facsimile machines transmits data to the other it activates a time delay circuit which it deactivates if it receives a response before the time delay period runs out. In the absence of a response in the time delay period, the transmitting facsimile machine considers that the data transmitted have been lost and it carries out a new transmission according to the same process.

However, it may be the case that the two facsimile machines are connected to a network which has propagation times greater than those of the STN, such as, for example, a cellular radiotelephone network. Moreover, in this latter case, for instance, it is necessary to provide an adapter between the cable output of the facsimile machine and the radio network, which further increases the propagation time.

In such a case the propagation time back and forth between the two facsimile machines is of the order of magnitude of the time delay period and the late reception of responses frequently causes transmissions to be repeated. Moreover, it is often the case that the response returns at the moment when the data are being retransmitted so that this retransmission is interrupted and must be begun again.

There is no possibility of modifying the protocol by increasing the duration of the time delay because this would pointlessly extend the communication time in the standard case using the STN.

SUMMARY OF THE INVENTION

The present invention aims to propose a solution to the aforementioned problem associated with late responses, while avoiding modifying the protocol.

To this end, the invention relates to a process for facsimile data transmission between a first and a second facsimile machine via a data transmission network, a process in which the first facsimile machine transmits the facsimile data intended for the second facsimile machine and repeats its transmission in the absence of a response within a predetermined period, the process being characterised in that
the packet of data transmitted by the first facsimile machine and its moment of transmission are input,
the packet of data is transmitted to the second facsimile machine via the network,
a response from the second facsimile machine and the corresponding moment of reception are input
the interval of time between the said moment of reception and the expiry of the said period are determined according to the said moment of transmission,
the said interval of time is compared to a retransmission threshold and, if the said interval is greater than the threshold,
the response of the second facsimile machine is retransmitted to the first, if it is not greater, the response is blocked.

Thus any risk of collision between a transmission from the first facsimile machine and a response retransmitted thereto is avoided, so that operation is satisfactory.

Advantageously, if the said interval is less than the threshold and the packet of data transmitted by the first facsimile machine is input a second time, the transmission of this second packet is cancelled.

Thus a transmission, which has then become pointless, on the network is avoided by the reception of the response.

Figure 2:
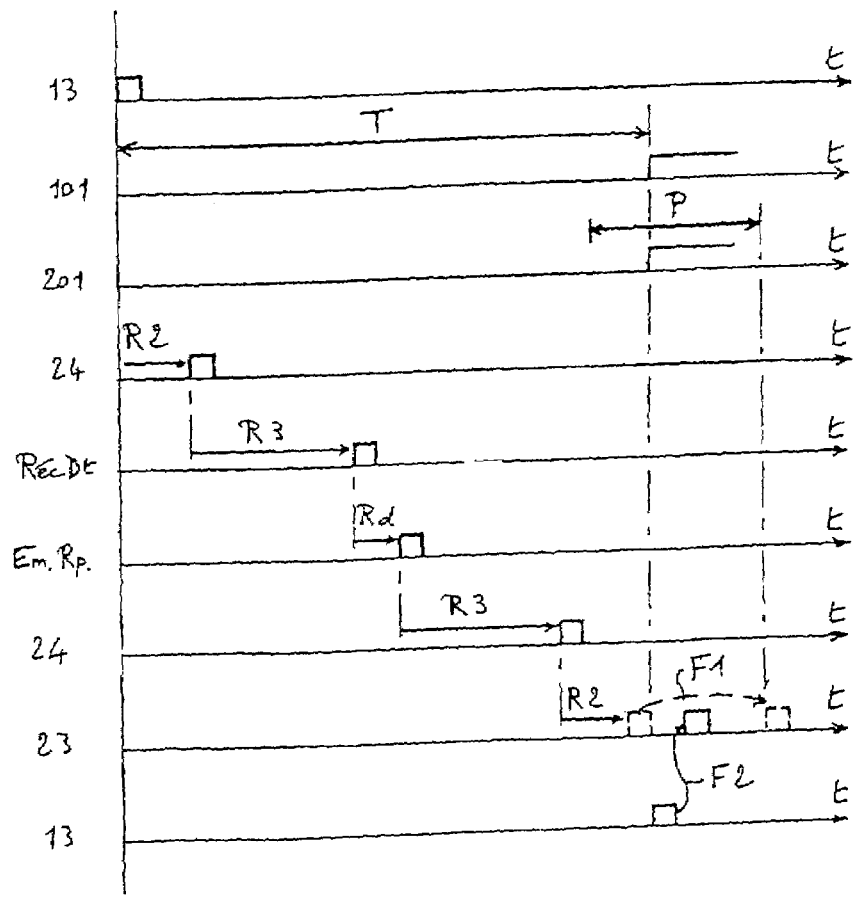

The invention will be better understood with the aid of the following description of the preferred embodiments of the process of the invention with reference to the attached drawing in which:

FIG. 1 is an operational block diagram showing a facsimile machine connected by an adapter to a GSM radiotelephone handset, for implementation of the process of the invention, and FIG. 2 is a time diagram, according to the time t, illustrating the process of the invention.

DETAILED DESCRIPTION OF THE PREFERRED EMBODIMENTS

FIG. 1 shows a standard facsimile machine 1 connected to a handset 3 of the GSM cellular radiotelephone network 31 by an adapter 2 for the transmission format of the facsimile data.

The facsimile machine 1 comprises a time base 10—with a timer circuit 101—connected to a microprocessor 11 which controls the various circuits of the facsimile machine and, in particular, is connected to a unit 12 for processing the facsimile protocol T30 and to a standard circuit 13 for telephone line interface, engagement of the line and data exchange, comprising, in particular, a modem. For the sake of clarity the other standard circuits of the facsimile machine 1 have not been shown.

The adapter 2 comprises a time base 20—with a timer circuit 201—connected to a microprocessor 21 which is itself connected to a unit 22 for processing exchanges of facsimile data, and to two interface circuits 23 and 24 for the exchange of data, connected respectively to the telephone interface circuit 13 and to a connector of the handset 3. The interface circuit 23 is similar to the circuit 13 and the interface circuit 24 permits a bi-directional exchange of data at logic levels with the handset 3 via a connector thereof.

The facsimile machine 1 can thus, via the GSM network 31, exchange facsimiles with another facsimile machine 4 (shown very schematically as a radio terminal) also connected to the GSM network or connected to the switched telephone network STN or to any other network which is itself connected to the GSM network 31.

The process for transmitting facsimiles between the two facsimile machines 1 and 4 according to the present invention will now be explained.

After a standard telephone call by sending dialing on the GSM network 31 from the telephone interface circuit 13, and thus establishment of a radiotelephone link, the exchanges of data firstly concern signaling data for establishing a logic connection between the two facsimile machines 1, 4, a connection intended to transmit the data representing the image of the facsimile document.

Each time data are received by the adapter 2 (tones or frames), from one side or the other thereof, the adapter transforms these data before retransmitting them to the other side, so that they are compatible with the telephone interface circuit 13 or the handset 3 which will receive them. A certain delay follows, which is added to the delay or period of transmission on the GSM network 31.

Thus, in the case for which the facsimile machine 1 is the transmitter of the facsimile, it receives from the facsimile machine 4—in response to its telephone call—the signal CED at 2.1 kHz over more than 3 seconds, and the signal DIS for identification of the called party, and transmits the signal DCS indicating its speed of operation, as well as speed test signals.

The timer circuit 101, or time delay, is activated when a packet of facsimile data, signaling or a frame of image data is transmitted to the network 31, and is deactivated in the case of reception of a response from the other, remote facsimile machine 4 within a predetermined time delay period T (FIG. 2), the transmission being repeated if the timer circuit 101 reaches the point of expiry. The packets of data transmitted by the associated facsimile machine 1 are input into the adapter 2, the moment of reception thereof is also input according to the signals of the time base 20, and the packet of data is transmitted on the GSM network 31 and, in the case of reception of a response from the other facsimile machine 4, this response and the moment of reception thereof are input according to the signals of the time base 20. The time interval is then determined between this moment of reception of the response and the expiry of the period T, which has begun to run from the stored moment of reception, in the adapter 2, of the packet of data of the facsimile machine 1 which have been transmitted on the network 31. This interval of time is compared with a retransmission threshold P and, if this interval of time is greater than the threshold P, the response of the facsimile machine 4 is retransmitted to the local facsimile machine 1, otherwise it is blocked by thus delaying the retransmission of the response to the facsimile machine 1.

It will be noted that the precise state of the timer circuit 201 is read-accessible. i.e. apart from the binary information indicating that the time delay has expired, it is also possible to know the time remaining before expiry and to do so at least in the part of the predetermined time range P of the retransmission threshold preceding the moment of this expiry. In practice, in this case the timer circuits 101 and 201 are digital with a base of counters 102 and 202 respectively, of which it is possible to read the state of the various stages and which are controlled by a clock signal H of a specific frequency. A comparator 103, and 203 respectively, compares the output of the counter 102, and 202 respectively, with a time delay threshold value and, by a retroaction connection (not shown), blocks the clock signal 11 when the time delay threshold value is reached or just exceeded. The output in the active state—in this case high—of the comparator 103, 203 thus indicates that the period T of the time delay has at least been reached. The time delay threshold equals T for the comparator 103 and equals S2 for the comparator 203, of a value substantially equal to T as explained hereinunder. The value T possibly being variable from one typo of data packet to another, the processing unit 22 ensures, in particular, the recognition of the signals, such as frames, passing though the adapter 2 in order to adjust the value S2 to the correct time delay value.

Preferably, as in this case, the comparator 103, 203 is formed by a digital subtractor circuit, of which the output sign changes state when the time delay threshold is reached (or exceeded by one unit). When the counters 102, 202 advance, the output difference value of the comparator 103, 203 supplies a number of periods of the clock signal H which represents the interval of time remaining before the end of the period T. This value thus permits direct determination of whether the adapter 2 can retransmit to the facsimile machine 1 a response from the remote facsimile machine 4. If this difference value is too low, the adapter 2 blocks the retransmission (to the facsimile machine 1) of this response by deferring or delaying it until the current moment exits the range P, in order to avoid any risk of collision with a retransmission from the facsimile machine 1.

In this example, in the adapter 2 during reception of data from the associated facsimile machine 1, it is determined whether this is a retransmission of previous data and, if so, if a response is awaiting retransmission to the associated facsimile machine 1, the retransmission of the data on the GSM network 31 is blocked since it is pointless. In other words, if the said interval is less than the threshold of the range P and the packet of data transmitted by the first facsimile machine 1 is input a second time, the transmission of this second packet is cancelled.

In order to determine if a retransmission is involved, the data received from the facsimile machine 1 can be stored and compared each time with the preceding data. In the case of parity, this is a case of a retransmission. It is also possible to determine that a retransmission is involved by storing the alternations between transmissions and receptions in the adapter 2, on the side of the associated facsimile machine 1. Indeed the protocol T30 operates in an alternating manner so that a transmission, other than the first one, still takes place in response to a reception of data. There is no spontaneous transmission of new data. Any break in the regular alternation of exchanges, one by one, indicates a retransmission of already-transmitted data.

In order to avoid pointlessly deferring the retransmission of the response to the facsimile machine 1 when a second packet of data transmitted by the first facsimile machine 1 is input in the period T and when the response of the second facsimile machine 4 has previously been blocked, this response is retransmitted immediately afterwards to the first facsimile machine 1, since any risk of collision has then disappeared, the timer circuit 101 having just been reactivated.

FIG. 2 illustrates the process according to the present invention. The reference numbers on the left of the drawing indicate the circuit which transmits or receives the signal illustrated.

The facsimile machine 1 activates the timer circuit 101, releasing the clock signal H, and transmits, via the telephone interface circuit 13, a packet of data which is received and stored by the adapter 2. In the same way, this adapter activates the timer circuit 201 with the same time delay period as the timer circuit 101, and retransmits the adapted packet of data to the handset 3 by the handset interface circuit 24, with an adaptation delay R2 (circuit 24). The activation of the timer circuit 201 is equivalent to an input of the moment of reception of the packet. The handset 3 transmits the packet via the network 31 and the remote receiving facsimile machine 4 receives (Rec. Dt) the packet of data after the additional <<network>> delay R3 of passage through the handset 3 and the GSM network 31, and transmits its response (Em. Rp.) with a delay Rd, to which the delay R3 of the GSM network 31 and of the handset 3 is added when the adapter 2 (circuit 24) receives the response. This response is then adapted and—before retransmitting it (circuit 23) to the facsimile machine 1—the state of the timer circuit 201, substantially an image of the timer 101, is read to determine if the present moment is in the collision-risk rage P in which the time delay of the circuit 101 expires. This is the case in the example of FIG. 2 where the planned transmission of the response (block shown in broken lines following the delay Rd) is in the range P. The retransmission of the response of the remote facsimile machine to the facsimile machine 1 is then deferred and thus blocked. The arrow Ft indicates the planned delay for retransmission of the response, ie. it marks the moment of the end of the range P. Since the facsimile machine 1 is, in this case, carrying out a retransmission (circuit 13, bottom line in FIG. 2) of the packet already transmitted, just after expiry of the time delay of the circuit 101, the adapter 2 thus carries out (arrow F2) the retransmission of the response to the facsimile machine 1 without waiting for the current moment to exit the range P, since there is no longer any risk of collision.

As indicated above, the moment when the time delay T of the circuit 101 expires is, in this example, within the range P and not at the end of the range P, in order to ensure a safety margin against uncontrolled variations in the time delay value T. On the basis of this, in FIG. 2 the range P represents the sum of the retransmission threshold value which is the length of the portion before the rising of the output signals of the circuits 101 and 102, which are expiring, and of the safety margin mentioned above.

In the case for which the transit time or delay R2 through the adapter 2 is not negligible before the period T it may be useful to compensate for it with respect to the remote facsimile machine 4. This equates to functional integration, for exchanges via the network 31, of the facsimile machine 1 and the adapter 2, having—for the exchanges on the network side 31—a second timer circuit in the adapter 2, delayed by R2 with respect to the circuit 101 and thus masking the delay R2 with respect to the remote facsimile machine 4. Thus, for the remote facsimile machine 4, the switched telephone network is emulated by masking the delaying effect (R2) of the adapter 2. The local exchanges between the facsimile machine 1 and the adapter 2 can in the same way be managed by time delays, i.e. the adapter 2 acts as an intermediate relaying facsimile machine, the connection between the facsimile machine 1 and the remote facsimile machine 4 thus being in two sections: local and network 31. The adapter 2 then has, in the unit 22, the means necessary for total management of the protocol T 30.

As mentioned above, provision can be made for physical integration of the facsimile machine 1, the adapter 2 and even the handset 3 into a single assembly in order to create a radio-link facsimile machine.

As the adapter 2 can measure the delay R3+Rd+R3 between a transmission via the network 31 to the remote facsimile machine 4 and the response, it can estimate the time R3 thereof for traversing the network 31, since the delay Rd has a value which can be known since it is intrinsic to facsimile machines. On the basis of this, the adapter 2 receiving data from the remote facsimile machine 4 at a given moment can deduce therefrom that its timer circuit, which is similar to the circuit 101, has a duration left to run which equals T-R3. The adapter 2 can then activate a timer circuit adjusted to the value T-R3. When the adapter 2 must respond to the remote facsimile machine 4, this response is delayed if the aforementioned timer circuit indicates that a time value is still to run which is substantially (cf. range P) equal to R3, i.e. that there would be a collision in the response, upon its arrival at the remote facsimile machine 4, with a retransmission therefrom. The principles set out above for the exchanges between the adapter 2 and the associated facsimile machine 1 are thus also applicable to exchanges between the adapter 2 and the remote facsimile machine 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for transmission of a packet of facsimile data between a first facsimile machine and a second facsimile machine via a network, wherein the first facsimile machine transmits the facsimile data intended for the second facsimile machine and repeats its transmission in the absence of a response within a predetermined period (T), the method comprising:

receiving a packet of data transmitted by the first facsimile machine and its moment of transmission;

transmitting the packet of data to the second facsimile machine via the network;

receiving a response from the second facsimile machine and the corresponding moment of reception;

determining an interval of time between said moment of reception and the expiry of said period (T) according to said moment of transmission;

comparing said interval of time to a retransmission threshold (P);

if said interval is greater than the threshold (P), retransmitting the response of the second facsimile machine to the first facsimile machine; and if said interval is not greater than the threshold (P), blocking the response.

2. The method according to claim 1, wherein if said interval is less than the threshold and the packet of data transmitted by the first facsimile machine is input a second time, the transmission of this second packet of data is cancelled.

3. The method according to claim 1, wherein when a second packet of data transmitted by the first facsimile machine is input at an end of said period (T) and when the response of the second facsimile machine has previously been blocked, this response is retransmitted immediately afterwards to the first facsimile machine.

4. The method of claim 1, wherein in the transmitting step, the network is a mobile communication network.

5. The method of claim 1, wherein in the step of receiving the packet of data from the first facsimile machine and its moment of transmission, an adapter coupled to the first facsimile machine receives the packet of data from the first facsimile machine and the moment of transmission.

6. The method of claim 5, wherein the transmitting step includes:

transmitting, by the adapter, the packet of data received from the first facsimile machine to a handset; and transmitting, by the handset, the received packet of data to the second facsimile machine over the network.

7. The method of claim 6, wherein the network is a GSM network.

* * * * *